(12) United States Patent
Niemioja

(10) Patent No.: US 11,485,128 B2
(45) Date of Patent: Nov. 1, 2022

(54) METHOD AND APPARATUS FOR LAMINATING GLASS SHEETS

(71) Applicant: Glaston Finland Oy, Tampere (FI)

(72) Inventor: Jussi Niemioja, Tampere (FI)

(73) Assignee: GLASTON FINLAND OY, Tampere (FI)

( * ) Notice: Subject to any disclaimer, the term of this patent is extended or adjusted under 35 U.S.C. 154(b) by 0 days.

(21) Appl. No.: 17/551,590

(22) Filed: Dec. 15, 2021

(65) Prior Publication Data

US 2022/0184938 A1 Jun. 16, 2022

(30) Foreign Application Priority Data

Dec. 15, 2020 (FI) .................................. 20206305

(51) Int. Cl.
| | |
|---|---|
| B32B 41/00 | (2006.01) |
| B32B 37/00 | (2006.01) |
| B32B 37/18 | (2006.01) |
| B32B 38/18 | (2006.01) |

(52) U.S. Cl.
CPC .......... *B32B 41/00* (2013.01); *B32B 37/0053* (2013.01); *B32B 37/182* (2013.01); *B32B 38/18* (2013.01)

(58) Field of Classification Search
CPC ... B32B 41/00; B32B 37/0053; B32B 37/182; B32B 38/18
USPC ................ 156/60, 64, 350, 351, 378, 379
See application file for complete search history.

(56) References Cited

U.S. PATENT DOCUMENTS

| | | | |
|---|---|---|---|
| 4,952,227 | A | 8/1990 | Herrington et al. |
| 5,853,516 | A | 12/1998 | Lehto |
| 2008/0178989 | A1 | 7/2008 | Ala-savikota et al. |

(Continued)

FOREIGN PATENT DOCUMENTS

| | | |
|---|---|---|
| EP | 2431172 B1 | 9/2012 |
| FI | 100009 B | 8/1997 |
| FI | 118003 B | 5/2007 |

(Continued)

OTHER PUBLICATIONS

The extended European Search Report dated May 10, 2022, by the European Patent Office in corresponding European Patent Application No. 21210431.9-1107. (6 pages).

(Continued)

*Primary Examiner* — Michael N Orlando
*Assistant Examiner* — Joshel Rivera
(74) *Attorney, Agent, or Firm* — Buchanan Ingersoll & Rooney PC

(57) ABSTRACT

By means of a method and an apparatus for laminating glass sheets, the effect of the variation of the initial temperature of the glass on the success of the lamination furnace treatment and the variation of the quality of the laminated glass can be eliminated, thus reducing quality costs. In the method, a sandwich structure sheet including glass and laminating film layers is heated in a lamination furnace, after which the heated sandwich structure sheet is conveyed between a pair of press rolls, and before the lamination furnace is measured the temperature of at least one glass sheet comprised in the sandwich structure sheet, and on the basis of that data, the heating effect of the lamination furnace on the sandwich structure sheet is changed. The apparatus comprises, upstream of the lamination furnace, a temperature measuring device for measuring the temperature of the glass sheets.

11 Claims, 3 Drawing Sheets

(56) References Cited

U.S. PATENT DOCUMENTS

2014/0216641 A1   8/2014   Canfield

FOREIGN PATENT DOCUMENTS

| | | |
|---|---|---|
| WO | 2004080905 A1 | 9/2004 |
| WO | 2006051163 A1 | 5/2006 |

OTHER PUBLICATIONS

Finnish Search Report issued in corresponding Finnish Patent Application No. 20206305 dated Jun. 2, 2021. (1 page).

METHOD AND APPARATUS FOR LAMINATING GLASS SHEETS

CROSS-REFERENCE TO RELATED APPLICATION

This application claims priority to Finnish Patent Application No. 20206305, filed on Dec. 15, 2020, the entire content of which is incorporated herein by reference for all purposes.

FIELD

The present disclosure relates to a method and an apparatus for laminating glass sheets.

BACKGROUND

Glass is laminated to reinforce the glass, to improve its safety in use or to provide different coatings or tinting. In the lamination process, a plastic film is disposed between two glass sheets, whereupon a sandwich structure sheet comprising glass and plastic layers is formed. The plastic film is, for example, polyvinyl butyral (PVB), ethyl vinyl acetate (EVA) or SentryGlas™. Common plastic film thicknesses are 0.38, 0.76 and 1.52 mm. The thickness of the glass sheets is typically 3-12 mm. The plastic film is heated in a lamination furnace to the target temperature, whereupon the temperature measured on the outer surface of the sandwich structure sheet immediately after the furnace is 60-80° C., depending on the thickness and composition of the sandwich structure sheet and the position of the measuring device. The temperature of the plastic film is then considered to be at the target temperature which, for example for PVB film, is 60-65° C. At the target temperature, or in other words at the bonding temperature, the sandwich structure sheet passes between a pair of press rolls, which presses air out of its material interfaces. The lamination furnace with its press rolls is also called an air discharge conveyor, and one aim in using it is to discharge air from between the material layers and to stick the layers together into a tight sandwich structure sheet. No air should be allowed to absorb back between the material layers after the lamination furnace treatment. Usually, successful lamination is sought by an autoclaving process following the lamination furnace treatment, which can help dissolve the remaining air evenly in the plastic layer.

The press roll pair removes air from the moving sandwich structure sheet by compressing it, whereupon the air in the material interfaces inside the sandwich structure becomes highly overpressurised and tries to discharge from the sandwich structure sheet. Common quality problems in producing laminated glass are the formation of visible air bubbles in the sandwich structure sheet and the failure to form a lamination bond. The reason for the formation of air bubbles is, for example, the unsuccessful discharge of air in the above-mentioned lamination furnace treatment. Overly high temperature of the sandwich structure sheet at the lamination stage can cause problems for the discharge of air bubbles from the sandwich structure sheet because in that case the films can melt and adhere to each other or to the glass prematurely and the air remaining between the layers cannot be discharged by compressing with the press roll pair. On the other hand, if the temperature of the sandwich structure sheet is too low, this can prevent the formation of a strong bond between the glass and the plastic.

The plastic film is disposed between glass sheets in a so-called laminating room, where the air temperature is controlled to a temperature of 18-20° C. The temperature of the glass sheets transferring from the factory hall to the laminating room can vary depending on, among other things, the location of the factory, the weather and the water temperature in the glass washing machine preceding lamination. There are significant temperature differences in the inlet temperatures of the glass sheets on entry into the laminating room, which are due, among other things, to the timing of the glass washing. Glass sheets waiting longer in the factory hall for lamination typically cool down closer to the temperature of the factory hall. The advancement of the glass sheets towards the lamination furnace also often stops in the laminating room, for example, due to the lunch breaks of production staff, in which case the glass sheets that stop in the laminating room cool down even closer to the temperature of the laminating room. For the reasons described above, there is considerable variation in the temperatures of the glass sheets to be laminated conveyed in the lamination furnace. This temperature variation is transferred almost completely, or at least for the most part, also to the maximum temperatures of the glass and plastic in heating, to the temperature measured from the glass after the lamination furnace, and to the temperature at which the sandwich structure sheet passes between the above-mentioned pair of press rolls. One problem is that this temperature variation can lead to variation in the quality of the lamination. Some of the laminated glass sheets can be a failure due to the above-mentioned temperature variation, which increases production costs. This problem can be more difficult in connection with films which require more precise target temperatures, such as SentryGlas™ and PVB grades with certain special properties.

SUMMARY

One objective of the present disclosure is to provide a method and an apparatus for laminating glass sheets by means of which the effect of the variation in the initial temperatures of the glass sheets on the success of the lamination furnace treatment and the variation in laminated glass quality can be eliminated, thus reducing quality costs.

EP 2431172 B1 discloses a method for manufacturing compound safety glass. In the method is used a heater box module for heating a sandwich structure sheet, comprising an upper heater box from which heat is discharged by means of an infrared emitter and hot air is discharged by an upper circulating-air system towards the glass being laminated.

FI 100009 B describes a method and an apparatus for laminating glass sheets, wherein the sandwich structure sheet to be laminated is preheated with radiation heat to 30° C.-45° C., after which first pressing between a pair of rolls is carried out. After this, the sandwich structure is heated by means of two-sided hot-air blasting to a temperature of 60° C.-85° C., which is followed by pressing between a second pair of press rolls.

FI 118003 B describes a method and an apparatus for laminating glass panels, wherein the sandwich structure to be laminated is preheated with radiation heat, after which the sandwich structure is heated by means of a bilateral blast of hot air simultaneously with radiation heating.

However, none of the foregoing publications solve the problem which variation in the initial temperature of the glass causes to the success and quality of the lamination.

An objective of the disclosure can be achieved by means of a method for laminating glass sheets, in which method at least one laminating film is disposed between the glass sheets, the thus formed sandwich structure sheet is conveyed into a lamination furnace, in which the sandwich structure sheet is heated, and the heated sandwich structure sheet is conveyed between a pair of press rolls. In the method, before the sandwich structure sheet is conveyed into the lamination furnace, the temperature of at least one glass sheet comprised in the sandwich structure sheet is measured, the measured temperature is sent to a computer, and the heating effect of the lamination furnace on the sandwich structure sheet is reduced in accordance with the computer calculation if the measured temperature is higher than the default value of the temperature, or the heating effect of the lamination furnace on the sandwich structure sheet is increased in accordance with the computer calculation if the measured temperature is lower than the default value of the temperature. A further objective of the disclosure is to provide an apparatus for implementing the method, comprising a lamination furnace with heating means, a roller track, at least one device for changing the rate of travel provided by the roller track to the glass sheet, a pair of press rollers, a computer, and before the lamination furnace a temperature measuring device for measuring the temperature of the sandwich structure sheet.

DESCRIPTION OF THE FIGURES

The disclosure is described in greater detail in the following, with reference to the accompanying drawings, in which.

DETAILED DESCRIPTION

Figure 1:
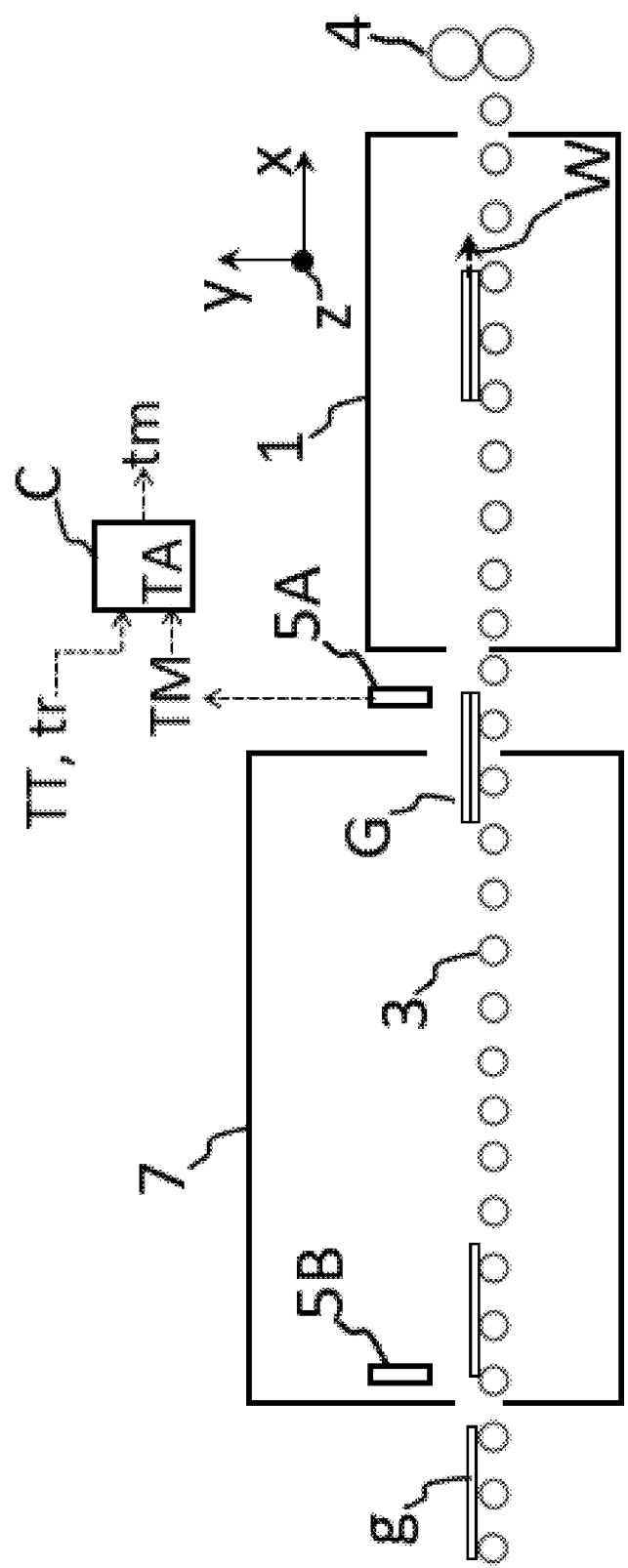
FIG. 1 shows a diagrammatic side view of the lamination apparatus according to exemplary embodiments of the present disclosure.

FIG. 1 diagrammatically shows an exemplary lamination line in which exemplary embodiments according to the present disclosure can be used. This view is from the side, that is, as seen from direction z. FIG. 1 shows a roller track including rollers 3 along which the glass sheets g to be laminated are conveyed from the factory hall into a laminating room 7. The roller track of the lamination line includes several separately driven and controlled roller track sections. The laminating films are located in the laminating room 7, where they are placed between the glass sheets to be laminated by devices not shown in FIG. 1 for assembling the sandwich structure sheet. The sandwich structure sheet G thus formed includes at least two glass sheets and one laminating film. From the laminating room the sandwich structure sheet is moved on towards the lamination furnace 1. For the lamination furnace is first manually selected a heating recipe, for example with a keyboard or automatically, on the basis of the total thickness of the sandwich structure. The heating recipe includes at least the duration of heating or the conveying speed, the control temperature of the lamination furnace, and in some furnace types also the rotational speed of the impeller of the blower. The conveying speed through the lamination furnace is typically constant, whereupon the duration of heating $t = W \times L$, where L is the length of the furnace and W is the conveying speed at which the roller track moves the sandwich structure sheet as it moves through the lamination furnace. The roller track of the lamination furnace is provided with at least one device for changing the conveying speed of the roller track, that is, the rate of travel provided by it to the glass sheet, which include, for example, a gearbox, a frequency converter or a servomotor.

Before being conveyed into the lamination furnace, the temperature of at least one glass sheet comprised in the sandwich structure sheet is measured. This temperature can be measured from the glass sheets g entering the laminating room by means of a temperature measuring device 5B or from the glass sheets in the sandwich structure sheet G with a temperature measuring device 5A. One advantage of measuring device 5B with respect to measuring device 5A is that it provides information on all glass sheets in the sandwich structure sheet. A disadvantage of measuring device 5B with respect to measuring device 5A is that there is a significant amount of time for the temperatures of the glass sheets to change before being conveyed into the lamination furnace. This change of temperatures is difficult to take into account and significant, for example, when the glass sheets stop in the lamination furnace, for example for the duration of a lunch break. It is preferable to measure the temperature at most 120 seconds before the sandwich structure sheet is conveyed into the lamination furnace. The temperature measuring device 5A located immediately before the lamination furnace measures the temperature on only one glass sheet g comprised in the sandwich structure sheet G. This is, however, often sufficient because the glass sheet batches to be laminated usually arrive from pretreatment (e.g. a wash) to lamination successively, in which case the temperature differences between the glass sheets in the sandwich structure are minor. With the temperature measuring device 5A located on two different sides of the sandwich structure sheet is obtained the temperature of two glass sheets comprised in the sandwich structure sheet. The temperature measuring device 5A which measures the temperature from the surface of a preassembled sandwich structure sheet is a more preferable solution than the temperature measuring device 5B. It is, therefore, advantageous to measure the temperature from the surface of a preassembled sandwich structure sheet. The temperature measuring device 5A is preferably located at a maximum distance of three metres from the start of the lamination furnace.

Before the furnace, approximately at the temperature measuring device 5A, is preferably also a device which measures the total thickness of the sandwich structure sheet. The total thickness of the sandwich structure sheet can thus be automatically included in the heating recipe. Such measuring devices are based, for example, on the reflection of laser light or ultrasound from the material interfaces.

The heat capacity of the plastic film disposed between the glass sheets in the laminating room is low compared to the heat capacity of the glass sheets, and thus its initial temperature has only a minor effect on the heating-up of the sandwich structure sheet. In addition, the initial temperature of the plastic film is constant, that is, at least approximately the same as the temperature of the laminating room. Therefore, it is sufficient to measure the initial temperature of the glass.

The above-mentioned temperature measuring device is preferably a so-called radiation thermometer, such as an infrared meter, a pyrometer, a thermal imaging camera or a temperature scanner. The most preferable choice is the pyrometer. By means of a radiation thermometer, the surface temperature I of a glass sheet can be measured without touching it. The so-called low emissivity coatings are relatively common also in laminated glass. The coating can prevent temperature measurement with the above-mentioned radiation thermometers. The coating is almost always on the upper surface of the glass sheet moving on the roller track. Thus, it can be advantageous that the temperature of the glass is measured on the lower surface of the glass sheet, in which case the radiation thermometer is located below it. The measured temperature TM or temperatures of the glass sheet are sent to a computer C, in which is carried out a calculation using the measured temperature TM of the glass as source data. For example, the computer C can include a CPU (Central Processing Unit), ROM (Read Only Memory), RAM (Random Access Memory), and input/output interface (s) connected to each other, for example, through a bus. A predetermined program stored in the ROM can be read out to the work area of the RAM to be expanded, and various processing can be performed according to the program, for example, to perform and output calculations, or to display information on a display, or to control other systems such as the furnace. The computer preferably automatically reduces, or at least automatically instructs to reduce, the heating effect of the lamination furnace on the sandwich structure sheet if the measured temperature TM is higher than the default value TA of the temperature, or correspondingly increases or instructs to increase the heating effect of the lamination furnace on the sandwich structure sheet if the measured temperature TM is lower than the default value TA of the temperature. The set value affecting the heating effect is increased or decreased in accordance with the computer calculation.

The heating effect is a factor which affects the temperature change of the sandwich structure sheet. As the heating effect of the lamination furnace decreases, the temperature change of the sandwich structure sheet in the lamination furnace treatment decreases. As the heating effect of the lamination furnace increases, the temperature change of the sandwich structure sheet in the lamination furnace treatment increases.

The heating effect of the lamination furnace on the sandwich structure sheet is preferably changed by changing the duration t of the heating. The computer then controls the furnace to change the duration tr of heating in the heating recipe by change Δt if the measured temperature TM differs from the default value TA of the initial temperature of the glass sheet. The computer thus calculates a new duration tm of heating based on the measured temperature TM. The duration of heating is then increased if the measured temperature TM is lower than the default value TA of the initial temperature of the glass sheets. Correspondingly, the duration of the heating effect is reduced if the measured temperature is higher than the default value of the temperature.

The default value TA of the initial temperature of the glass sheets is, for example, 20° C. or an initial temperature found typical of glass sheets on the lamination line in question. The default value TA is thus a value already in the computer's memory. The duration of heating according to the heating recipe is tr. The change in the duration of heating Δt=tr−tm, where the duration tm of heating based on the measurement data TM is calculated by using the equation:

$$tm = tr \times \frac{(TT - TM)}{(TT - TA)} \times K$$

In the equation, the term TT is the target temperature sought for the sandwich structure sheet after the heating furnace. It is preferably a target temperature advantageous to the laminating film or the desired temperature measured from the sandwich structure sheet by temperature measuring device 5C located after the furnace. The term K is the correction coefficient which is dependent on the heating means of the lamination furnace and the control temperature, as well as on the composition of the sandwich structure sheet. The value of the correction coefficient K is within the range 0.9-1.1. With a typical plus minus 5° C. degree initial temperature difference TM−TA, the value of the correction coefficient K is 0.97-1.03. The effect of the initial temperature of the glass on the quality of the glass to be laminated can be significantly reduced already with the constant value 1 of the correction coefficient.

Figure 3:
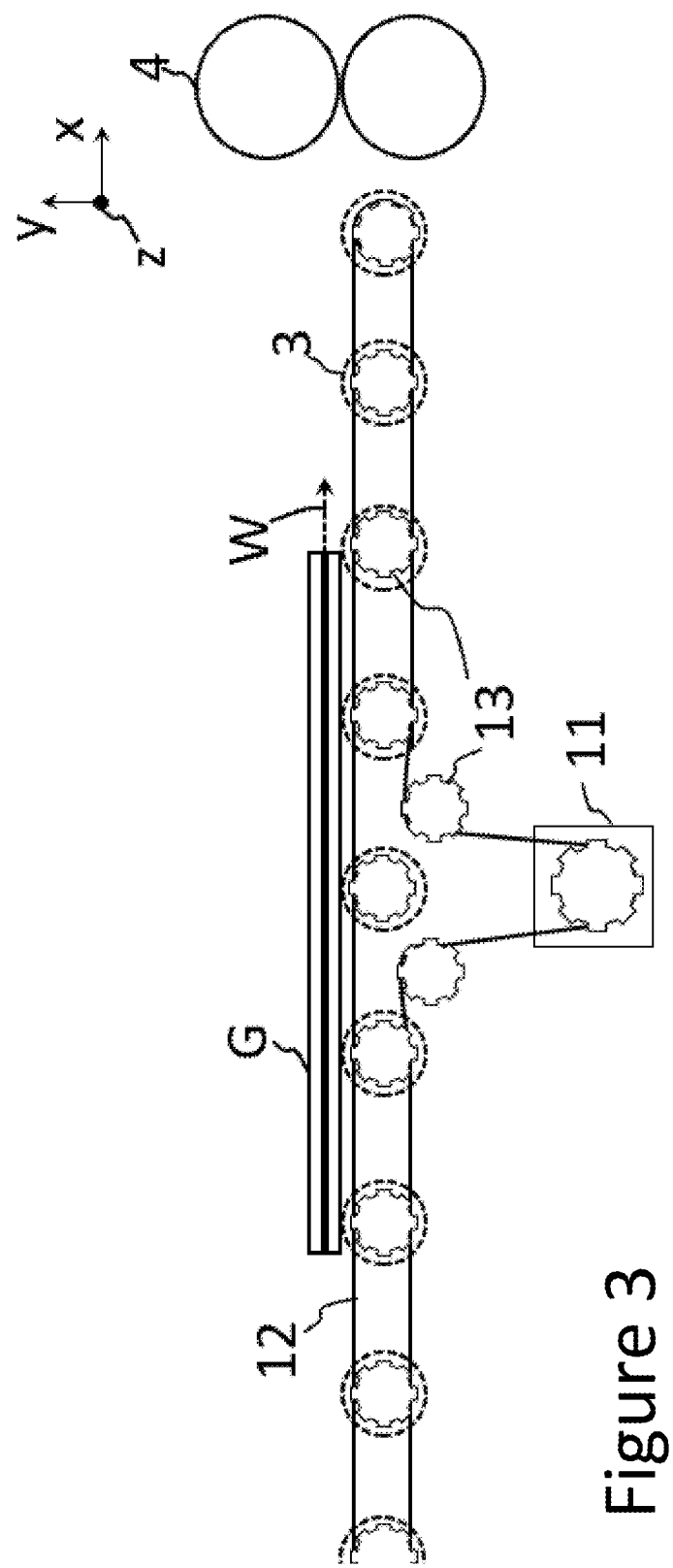
FIG. 3 shows a side view of an exemplary embodiment of a troller track of a lamination furnace.

FIG. 3 shows a side view of an exemplary embodiment of a roller track of a lamination furnace. A chain ring 13 is located at one end of each roller 3 and all chain rings are connected by a chain 12. The roller drive system in FIG. 3 also includes chain ring 13 with which the tension of the chain 12 can be adjusted. The chain is also connected to a chain ring of the device 11 for changing the conveying speed of the roller track. In exemplary embodiments, the device 11 for changing the conveying speed of the roller track can be a servomotor, a motor equipped with a gearbox, or a motor equipped with a frequency converter, for instance. The conveying speed W of the sandwich structure sheet G depends on the rotation speed of the chain, which depends on the rotation speed of the chain ring in device 11, which can be adjusted with a servomotor, a motor equipped gearbox, or a motor equipped with frequency converter, for instance. There are a lot of possibilities to convey the rotation of the servomotor, for instance, to rotation of rollers. The chain ring 13 can be a tooth ring or a belt ring, for instance, and the chain 12 can be a belt, for instance.

The change in the duration of heating is implemented by changing the conveying speed W, whereupon the conveying speed is increased to reduce the duration of heating and reduced to increase the duration of heating. The rate of travel W of the sandwich structure sheet is preferably 0.5-6 m/min, slowing down as the thickness of the sandwich structure sheet increases. The change in duration can also be implemented by stopping the sandwich structure sheet in the lamination furnace for varying lengths of time, which often causes harmful localised temperature differences in the sandwich structure sheet and makes the timing of the different stages on the lamination line more difficult.

The heating effect provided by the lamination furnace to the sandwich structure sheet can also be affected by changing the control temperature of the furnace, which is, however, at least in most furnace types a too slowly affecting way of controlling the problem in question. This is because the lamination furnace does not heat up, and especially does not cool down, quickly enough for the change in the control temperature to have time to affect, in a controlled manner, the temperature at which the sandwich structure sheet assembled a moment ago travels through the pair of press rolls 4 after the lamination furnace.

Figure 2:
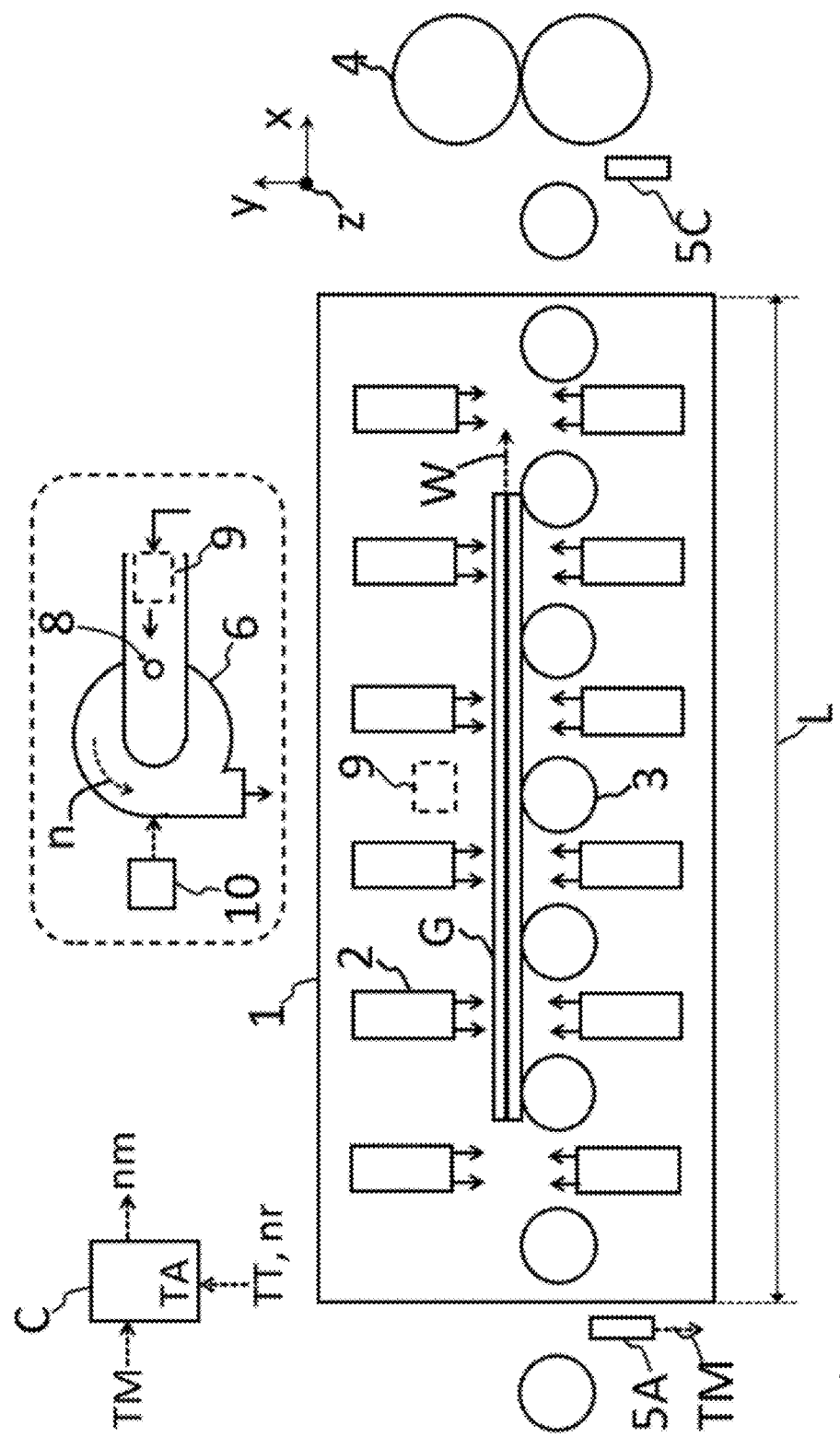
FIG. 2 shows a side view of a preferred lamination furnace according to exemplary embodiments of the present disclosure.

FIG. 2 shows a side view of an exemplary embodiment of a preferred lamination furnace for exemplary embodiments according to the present disclosure. The lamination furnace comprises heating means, which are preferably convection blowing means. The convection blowing means can comprise heating resistors 9, a blower 6 including a motor whose axel is connected to the impeller of the blower sucking air from the inside the lamination furnace, a frequency converter 10 for changing the rotational speed n of the impeller of the blower, an air distribution conduit for guiding the air from the blower to the blowing boxes 2, the air jets discharging from the blowing apertures of which impact with the sandwich structure sheet G. In FIG. 2, the arrows pointing out from the blowing boxes towards the glass sheet depict the above-mentioned air jets. The lamination furnace comprises a roller track including of several rollers 3 which convey the sandwich structure sheet in the lamination furnace during the heating process at the rate of travel W. The length of the lamination furnace is L. A frequency converter can also be referred to as a frequency changer, a variable-frequency drive, or an inverter drive, for instance.

The heating resistors 9 are preferably electrical resistor packs mounted in the air distribution conduit, on the suction side of the blower 6, through which the air drawn in by the blower flows. They may also be separate oblong resistor tubes which radiate directly towards the upper and lower surfaces of the sandwich structure sheet. In that case, the heating effect provided by the lamination furnace to the sandwich structure sheet can be affected by limiting, interrupting or pulsating the supply of electricity, which is, however, a complex way of controlling the problem disclosed in the summary. The heating resistors may also be other types of heating devices.

The heating effect of a furnace equipped with the type of convection heating means shown in FIG. 2 on a sandwich structure sheet can be adjusted by changing the rotational speed n of the impeller of the blower 6, because the motor of the blower 6 is equipped with a frequency converter 10. The effect of this type of change of setting is controlled, fast and allows taking into account the variation of the inlet temperature TM measured on the glass to be laminated in heating the laminated glass to reduce quality variation. In this case, the rotational speed of the impeller is increased if the measured temperature TM is lower than the default value TA of the temperature. Correspondingly, the rotational speed of the impeller is reduced if the measured temperature is higher than the default value of the temperature. The change of rotational speed is Δn. Increasing the rotational speed increases the blast pressure and volume flow rate at which the air jets discharging from the blowing apertures of the blowing boxes discharge towards the sandwich structure sheet. According to general laws regarding blowers and the convective heat transfer equations of jet systems, increasing the rotational speed increases the convective heat transfer coefficient by the power of (2/3) of the change in rotational speed. Thus, in the lamination furnace where convective heat transfer is strong compared to radiation heat transfer, the rotational speed n can be changed in accordance with the following example. Let the measured temperature TM=25° C., the default value TA of the temperature=20° C. and the target temperature TT=65° C. The heating requirement will then change proportionally (TT−TM)/(TT−TA)=(65−25)/(65−20)=to 0.89-fold. In order to take this into account, the convective heat transfer coefficient should be reduced to 0.89-fold of the original. This can be done by changing the rotational speed of the impeller to the value based on the measured temperature TM nm=nr×0.89 to the power of (3/2), where nr is the rotational speed in the heating recipe, by means of which the target temperature of 65° C. would be reached with an initial temperature of 20° C. The rotational speed nr in the heating recipe is, for example, the rotational speed of the impeller corresponding to the nominal frequency of the blower motor. In the lamination furnace of FIG. 2, the blast pressure of the air jets is preferably 100-1000 Pa.

The change in the convective heat transfer coefficient described above can also be implemented by reducing throttling if the air distribution conduits for guiding air from the blower to the blowing boxes are equipped with a throttle valve. Reducing throttling reduces the pressure losses of the airflow, whereupon the blast pressure in the blowing boxes increases. Thus, the heating effect of the lamination furnace on the sandwich structure sheet is reduced by increasing throttling and increased by reducing throttling. In the above-mentioned rotational speed and throttle valve methods the heating effect of the lamination furnace on the sandwich structure sheet is reduced by reducing the blast pressure and increased by increasing blast pressure. Of these methods, changing the rotational speed is preferable.

Convective heat transfer can also be adjusted by changing the blowing distance, which is, however, an inferior and more expensive method for changing the heating effect of the furnace on the sandwich structure sheet.

The control temperature of the furnace preferably ranges between 150-250° C., which is measured from the air distribution conduit with a thermoelement 8. The heating effect of convection heating on the sandwich structure sheet can be adjusted by changing the control temperature which the thermoelement 8 measures. A disadvantage of using this method is the slow realisation of the effect of the above-mentioned change.

One aim of the heating is typically to heat the plastic films in the sandwich structure to a bonding temperature of 55-75° C. depending on the film type. The thus heated sandwich structure sheet leaves the furnace and passes through the pair of press rolls 4 following the furnace. Pressing with the press roll pair forces the air on the interfaces of the layers of the sandwich structure sheet to discharge from the sandwich structure sheet. Preferably also the temperature TE of the sandwich structure after the lamination furnace is measured with the temperature measuring device 5C. This measured temperature TE can be used, for example, for controlling successful heating and for specifying the correction coefficient of the equation of the duration tm of heating described above. The temperature TE is then displayed on the monitor and sent to the computer as source data.

By using the method and the apparatus according to the disclosure, the quality variation and quality costs due to the inlet temperature of laminated glass sheets in a lamination furnace are substantially reduced.

Laminating film can refer to the plastic film used in the above description, but can also cover other possible film materials other than plastic. A glass sheet comprised in the sandwich structure can be a glass sheet to be included in the sandwich structure before the assembly of the sandwich structure or a glass sheet in an already assembled sandwich structure sheet.

It will be appreciated by those skilled in the art that the disclosure herein can be embodied in other specific forms without departing from the spirit or essential characteristics thereof. The presently-disclosed embodiments are therefore considered in all respects to be exemplary and not restrictive. The scope of the invention is indicated by the appended claims rather than the foregoing description and all changes that come within the meaning and range and equivalence thereof are intended to be embraced therein.

The invention claimed is:
1. A method for laminating glass sheets, comprising:
disposing at least one laminating film between glass sheets, thereby forming a sandwich structure sheet including the laminating film between the glass sheets;
conveying the sandwich structure sheet into a lamination furnace, in which the sandwich structure sheet is heated;

conveying the heated sandwich structure sheet between a pair of press rolls, wherein the method comprises, before the sandwich structure sheet is conveyed into the lamination furnace, measuring a temperature (TM) of at least one of the glass sheets comprised in the sandwich structure sheet, sending the measured temperature (TM) to a computer, and adjusting a heating effect of the lamination furnace on the sandwich structure sheet in accordance with a calculation by the computer, by reducing the heating effect of the lamination furnace on the sandwich structure sheet when the measured temperature (TM) is higher than a default value (TA) of the temperature, or increasing the heating effect of the lamination furnace on the sandwich structure sheet when the measured temperature (TM) is lower than the default value (TA) of the temperature.

2. The method according to claim 1, wherein the reducing of the heating effect of the lamination furnace on the sandwich structure sheet includes reducing a duration of heating.

3. The method according to claim 1, wherein the increasing of the heating effect of the lamination furnace on the sandwich structure sheet includes increasing a duration of heating.

4. The method according to claim 1, including blasting, on upper and lower surfaces of the sandwich structure sheet, hot air jets using a blower, and either reducing the heating effect of the lamination furnace on the sandwich structure sheet by reducing a rotational speed of an impeller of the blower or increasing the heating effect of the lamination furnace on the sandwich structure sheet by increasing the rotational speed of the impeller of the blower.

5. The method according to claim 1, wherein the temperature (TM) is measured on the surface of the sandwich structure sheet at most 120 seconds before the sandwich structure sheet is conveyed into the lamination furnace.

6. The method according to claim 1, wherein the temperature (TM) is measured from a lower surface of the glass sheet.

7. An apparatus for laminating glass sheets into a sandwich structure sheet, the apparatus comprising:
a lamination furnace with heating means;
a roller track;
at least one device for changing a rate of travel provided by the roller track to the glass sheet;
a pair of press rollers;
a computer; and
a temperature measuring device positioned upstream of the lamination furnace, and configured for measuring a temperature of the sandwich structure sheet before the sandwich structure sheet is conveyed into the lamination furnace.

8. The apparatus according to claim 7, wherein the heating means include convection heating means comprising at least one blower and a frequency converter for changing a rotational speed of the impeller of the blower.

9. The apparatus according to claim 7, wherein the temperature measuring device is a pyrometer.

10. The apparatus according to claim 7, wherein the temperature measuring device is located below the sandwich structure sheet at a maximum distance of 3 metres from a start of the lamination furnace.

11. A method for laminating glass sheets, comprising:
disposing at least one laminating film between glass sheets, thereby forming a sandwich structure sheet including the laminating film between the glass sheets;
conveying the sandwich structure sheet into a lamination furnace, in which the sandwich structure sheet moved by a roller track with conveying speed (W) 0.5-6 m/min is heated;
conveying the heated sandwich structure sheet between a pair of press rolls,
wherein the method comprises, before the sandwich structure sheet is conveyed into the lamination furnace, measuring a temperature (TM) of at least one of the glass sheets comprised in the sandwich structure sheet, sending the measured temperature (TM) to a computer, and adjusting a duration time of the sandwich structure sheet in the lamination furnace in accordance with a calculation by the computer, by increasing the conveying speed (W) of the roller track when the measured temperature (TM) is higher than a default value (TA) of the temperature, or decreasing the conveying speed (W) of the roller track when the measured temperature (TM) is lower than the default value (TA) of the temperature.

* * * * *